United States Patent [19]
Obrist et al.

[11] Patent Number: 5,415,384
[45] Date of Patent: May 16, 1995

[54] APPARATUS FOR CLAMPING A WORK PIECE AT A WORK STATION OF A MACHINING APPARATUS IN A WELL DEFINED POSITION

[75] Inventors: Basil Obrist, Gontenschwil; Ferdinand Troxler, Schenkon, both of Switzerland

[73] Assignee: Erowa AG, Reinach, Switzerland

[21] Appl. No.: 206,881

[22] Filed: Mar. 7, 1994

[30] Foreign Application Priority Data

Mar. 9, 1993 [DE] Germany ............... 43 07 342.5

[51] Int. Cl.⁶ .............................................. B23Q 1/08
[52] U.S. Cl. .................................................. 269/309
[58] Field of Search .............. 269/309, 310, 56, 900; 29/559, 563, 464, 33 P, 271; 33/180 R; 198/345

[56] References Cited

U.S. PATENT DOCUMENTS

| | | | |
|---|---|---|---|
| 4,390,172 | 6/1983 | Gotman | 269/309 |
| 4,586,702 | 5/1986 | Chambers | 269/310 |
| 4,735,671 | 4/1988 | Stoffel et al. | 269/309 |
| 4,932,642 | 6/1990 | Salenbiem et al. | 269/310 |
| 4,934,680 | 6/1990 | Schneider | 269/309 |
| 5,246,218 | 9/1993 | Yap et al. | 269/309 |

Primary Examiner—Robert C. Watson
Attorney, Agent, or Firm—Tarolli, Sundheim & Covell

[57] ABSTRACT

An apparatus for clamping a work piece comprises a base and a work piece carrier adapted to be put onto and fixed to the base. The base and the carrier comprise aligning means to align the position of the carrier relative to the base along three perpendicular coordinate axes as well as the angular position. The aligning means comprises first aligning element pairs in the form of cooperating reference surfaces at the carrier and the base, which define the position of the carrier in the Z-axis. The aligning means further comprises second and third aligning element pairs in the form of cooperating linear aligning element pairs, which define the position of the carrier in the X and Y-axes, respectively. The cooperating pairs each comprise a wedge-shaped centering member and a counterpart member with a matching centering slit. Clamping means is provided for clamping the carrier to the base in a well defined position which is defined by the aligning means. The clamping means comprises a plurality of clamping members, each including a pin member fixed to the carrier and a chuck member located in the base. The carrier comprises a flat surface which faces the base if the carrier is clamped to the base. The flat surface forms one of the reference surfaces. Each one member of the second and third pairs is directly connected to the flat surface. Each pin member is also directly connected to the flat surface.

15 Claims, 4 Drawing Sheets

APPARATUS FOR CLAMPING A WORK PIECE AT A WORK STATION OF A MACHINING APPARATUS IN A WELL DEFINED POSITION

FIELD OF THE INVENTION

The present invention refers to an apparatus for clamping a work piece at a work station of a machining apparatus in a well defined position. The apparatus comprises a base member to be fixed in the working area of a machining apparatus, and a work piece carrier member adapted to be put onto the base member and to be fixed thereto.

The base member and the work piece carrier member each comprise pair wisely cooperating aligning means in order to align the position of the work piece carrier member with respect to the base member along three coordinate axes running perpendicularly to each other as well as with regard to the angular position.

The clamping means are adapted to develop a clamping force to fix the work piece carrier member to the base member in the well defined position which is defined by the aligning means.

The aligning means comprising first aligning element pairs for the definition of the position of the work piece carrier member in the Z-axis in the form of cooperating reference surfaces located at the work piece carrier member and the base member, respectively, as well as second aligning element pairs for the definition of the position of the work piece carrier member in the X-axis and third aligning element pairs for the definition of the position of the work piece carrier member in the Y-axis, both the second and third aligning element pairs being in the form of cooperating linear aligning element pairs;

The cooperating linear alignment pairs each comprise a wedge-shaped centering ruler member and a counterpart member with a matching centering slit. The clamping means comprises a plurality of clamping members, each including a clamping pin member fixed to the work piece carrier member and a clamping means located in the base member.

A clamping apparatus of this kind is intended, when it is correspondingly dimensioned, to keep relatively big and heavy work pieces in a well defined position in the working area of a machining apparatus. Moreover, e.g. in the case of machining and metal cutting of such work pieces, the clamping apparatus must withstand the considerable forces occurring during this operation without adverse effect on the accuracy of the positioning of the work piece to be machined.

PRIOR ART

The development of large and heavy clamping apparatuses usually is based on experiences which have been made with smaller clamping apparatuses. In one of the known clamping apparatuses of relatively small design, there are provided, on both members of the clamping apparatus, two linear aligning element pairs along a circle around a central clamping means for defining the well defined angular position along the X-axis and the Y-axis in a X-Y coordinate system. The line along which the clamping means is effective runs in the third coordinate axis, the Z-axis. The operating flanges of the wedge-shaped centering ruler members and the operating edges of the corresponding centering slots extend radially with respect to the Z-axis.

The centering slots are in the shape of apertures in a common plate member which is axially resilient in the direction of the Z-axis. This plate member is fixed to the work piece carrier member while the aforementioned centering ruler members are fixed to the base member of the clamping apparatus. The centrally arranged clamping means comprises a clamping chuck member with a ball locking device built into the base member and a clamping pin member projection from and fixed to the work piece carrier member. For clamping the work piece carrier member to the base member, the clamping pin member is introduced into the clamping chuck member and the ball locking device is operated. In order to define the position of the work piece carrier member in the Z-axis, the work piece carrier member is provided with central-symmetrically arranged pin members which rest with their frontal surface on reference surfaces provided on the base member.

A clamping apparatus of this design is characterized by its ability to clamp the work piece carrier member on the base member with very high positional reproducibility and have proved their worth in the art since a long time, particularly if the forces acting on the work piece carried by the work piece carrier member during the machining operation are relatively low, as is the case e.g. in the electro erosive machining of work pieces.

During the machining by metal cutting processes, the usefulness of such clamping apparatuses is limited by their load handling capacity. Thus, only work pieces can be machined by using such a clamping apparatus which have dimensions that are not larger than the dimension of the work piece carrier member. If larger work pieces are machined, it is possible that forces can occur at the clamping apparatus which, under certain circumstances, can reach such values that the linear aligning elements and the clamping chuck member are excessively strained and are no longer in a position to properly operate and, even more important, to provide for the exact position of the work piece to be machined.

Particularly critical are torque forces imposed by the machining forces to the work piece carrier member with respect to the Z-axis; such torque forces can create excessively high pressure forces at ate operating flanges of the aligning element pairs which are responsible for maintaining the exact position of the work piece carrier member in the X- and Y-direction and with respect to its angular orientation. The result is that the exact and well-defined position of the work piece carrier member is no longer guaranteed. These pressure can be kept within reasonable limits by the measure that bigger and heavier clamping apparatuses are provided for the machining of larger work pieces whereby the aforementioned aligning element pairs are dimensioned correspondingly stronger and have a correspondingly higher radial distance from the Z-axis.

However, the clamping apparatus described herein before is not suited, due to its design, to adapt it for the machining of very large and heavy work pieces by a simple linear enlargement of its dimensions. Particularly, the central position of the clamping means proves to be not suited for such a measure because a single clamping chuck member would have to have very large dimensions due to the high clamping force required. In such a case, a clamping apparatus with bulky dimensions and a high weight would result which is impractical in handling.

A further problem is the location of the reference pins for defining the position of the work piece carrier member in the Z-axis. If these reference pins are located in a considerable distance from the line of effect of the clamping force, one has to take into account a deflection of the work piece carrier member which impairs the accuracy of the position thereof. In the other case, if the reference pins are located near to the line of effect of the clamping force, tilting moments can occur which are undesirable for the same reasons.

An other solution is disclosed in the European Patent Specification Nr. 0,403,428. This clamping apparatus comprises four clamping members generally designed as described herein before which are quite small and which are located in the region of the four corners of a rectangular pallet. All four clamping members are provided with aligning element pairs for the definition of the work piece carrier member in Z-direction. However, only a first one of the four clamping members is provided with two aligning elements pairs for the definition of the position in the X-axis as well as with two aligning element pairs for the definition of the position in the Y-axis. A second clamping member adjacent to said first clamping member is provided with only one aligning element pair for the definition of the position in the X-axis, and a third clamping member adjacent to said first clamping member is provided with only one aligning element pair for the definition of the position in the Y-axis. The fourth clamping member, located diagonally opposite to the first clamping member, does not have any aligning element pairs for the definition of the position in the X- or Y-axis. The origin of the coordinate system in the X-Y-axis of the entire apparatus, therefore, is in a corner of the work piece carrier member. The disadvantage is that thermal effects, particularly a different heating up of the elements of the work piece carrier member, can have disadvantageous effects over the entire length and width of the clamping apparatus.

With regard to the central location of the clamping members in each case and with regard to a uniform tilt-free loading thereof, the linear aligning element pairs for the definition of the position of the X-axis and the Z-axis are present in dual arrangement in the three aforementioned clamping members, in a diametrically opposite arrangement, such that totally four linear aligning member pairs are relevant for the definition of these axes even if two linear aligning member pairs would be sufficient due to geometric reasons. The mutual alignment of the four aligning element pairs requires an exceptionally high level of mounting accuracy in order to ensure that the reproducibility of the positioning is not impaired in view of the fact that the design is geometrically over-defined. Moreover, the expenditure of four complete clamping means each comprising a clamping member and its accessories is relatively high for the positionally well defined clamping of a work piece.

A solution which is simpler in this respect is disclosed in the prior art according to which, instead of four complete means with their accessories, there is provided only one clamping means with four clamping members of the kind referred to whereby the individual clamping chuck members of the clamping members are built into the base member. However, in this case, the clamping chuck members are of a cone-shaped design and have a ball locking mechanism which is located at the outside. The locking pin members are replaced by locking sleeve members which are cast into the work piece carrier member made of cast material. For the definition of the X- and Y-axes, there are provided four aligning element pairs situated in a centrally symmetric relationship such that the origin of the X-Y-coordinate system is in the center of the clamping apparatus. Such a design is more advantageous as far as the possibly different thermal behavior of the base member and the work piece carrier member is concerned than a placement of the origin in one of the four corners of the clamping apparatus. In such an apparatus, the linear aligning elements provided at the base member are constituted by projecting members having a wedge-shaped groove, and the linear aligning members provided at the work piece carrier member cooperating with said projecting linear aligning members are constituted by resilient sleeve members inserted into the work piece carrier member and fixed at the two ends thereof. The projecting front faces of the clamping sleeve members, on the one hand, and a plurality of projections arranged along a circle around the clamping chuck member, on the other hand, constitute the reference surfaces of the definition of the position of the Z-axis of the work piece carrier member with reference to the base member.

A disadvantage of such a design of a clamping apparatus may be seen in the fact that the possibility exists that the linear aligning elements for the definition of the position in the X- and Y-axes are not sufficiently released from forces occurring in lateral direction. Such lateral forces can have the effect, as in all clamping apparatuses of such a design, that the lateral forces have to be taken up solely by the friction forces along the reference surfaces for the definition of the position of the Z-direction.

In the case explained herein before, these reference surfaces are relatively small (i.e. three small dimensioned rest surfaces per clamping member) with the result that, even if the clamping force may be very high, the compensating forces created by friction may not be sufficient for taking up and compensating the lateral forces created by the machining of the work piece. Therefore, the exact and desired angular position of the work piece carrier member with respect to the base member is no longer ensured since the resilient sleeve members functioning as the linear aligning members of the work piece carrier member no longer can take up the lateral forces during the machining of the work piece without being deflected. A further disadvantage may be seen in the fact that the design of the work piece carrier member is quite complicated and, consequently, quite expensive. Finally, it must be pointed out that the work piece carrier member cannot be stored on a flat surface without auxiliary means, e.g. additional support members, due to the presence of the projecting clamping sleeve members. Otherwise, there is the danger that the reference surfaces located at the front surfaces of the clamping sleeve members are damaged with the result that the clamping accuracy in Z-direction is impaired.

OBJECTS OF THE INVENTION

It is an object of the invention to provide an apparatus for clamping a work piece at a work station of a machining apparatus in a well defined position, particularly when high machining forces act onto the work piece received on the work piece carrier member, which avoids the disadvantages of the clamping apparatuses of the prior art.

In view of the fact that in a machining plant the work piece carrier members are required in a much higher number than the base members corresponding therewith, it is a further object of the invention to provide an apparatus for clamping a work piece at a work station of a machining apparatus in a well defined position in which the costs of the work piece carrier member are greatly reduced without impairing the accuracy of the positioning.

In view of the fact that the user of the work piece carrier member should be provided with a clamping apparatus system in which the work piece carrier member is designed as simply as possible, it is a still further object of the invention to provide a clamping apparatus system of the kind referred to in which the user can design its own work piece carrier member by simply following certain guidelines given by the manufacturer or merchant of the clamping apparatus.

Thus, it is a still further object of the invention to provide an apparatus for clamping a work piece at a work station of a machining apparatus in a well defined position which is, particularly as far as the work piece carrier member is concerned, simple, inexpensive and may be adapted to any task occurring in practice and which, simultaneously, guarantees the required positional accuracy when a work piece fixed to the work piece carrier member is connected to the base member in order to be machined with high precision.

SUMMARY OF THE INVENTION

To achieve these and other objects, the invention provides an apparatus for clamping a work piece at a work station of a machining apparatus in a well defined position, comprising a base member to be fixed in the working area of a machining apparatus and a work piece carrier member adapted to be put onto the base member and to be fixed thereto.

The base member and the work piece carrier member each comprising pair wisely cooperating aligning means in order to align the position of the work piece carrier member with respect to the base member along three coordinate axes running perpendicularly to each other as well as with regard to the angular position.

Clamping means are provided and adapted to develop a clamping force to fix the work piece carrier member to the base member in the well defined position which is defined by the aligning means, whereby the aligning means comprise first aligning element pairs for the definition of the position of the work piece carrier member in the Z-axis in the form of cooperating reference surfaces located at the work piece carrier member and the base member, respectively.

The aligning means further comprise second aligning element pairs for the definition of the position of the work piece carrier member in the X-axis and third aligning element pairs for the definition of the position of the work piece carrier member in the Y-axis, both the second and third aligning element pairs being in the form of cooperating linear aligning element pairs.

The cooperating linear alignment pairs each comprise a wedge-shaped centering ruler member and a counterpart member with a matching centering slit, whereby the clamping means comprise a plurality of clamping members, each including a clamping pin member fixed to the work piece carrier member and a clamping chuck member located in the base mender.

The work piece carrier member comprises an essentially even, continuous flat surface at its side which faces the base member if the work piece carrier member is clamped to the base member, the flat surface portionally forming one of the reference surfaces, whereby each one member of the second and third linear aligning element pairs for the definition of the position of the work piece carrier member in X- and Y-direction is directly connected to the flat surface, and each of the clamping pin members of the clamping means is also directly connected to the flat surface.

With this concept, the work piece carrier member can be constituted by a simple flat plate member having plane-parallel top and lower surfaces. Normally, it is only necessary to provide this plate member with simple bores and threaded bores, respectively, to fix the linear aligning elements, the clamping pin members and the work piece by means of screws Such a design is not only extremely inexpensive, but offers also the possibility to use, as a base element, a work piece carrier member of own production or produced by another manufacturer as long a certain minimal requirements are maintained, i.e. size, parallelity etc.

Preferably, the plate member is provided with continuous bores for inserting screw means for fixing the linear aligning elements and the clamping pin members in order to ensure that all screw means are operable from that side which is opposite to the base member.

If the continuous bores have a diameter which is larger than the diameter of the screw means to be received in these bores such that a radial clearance for the screw means is ensured, the exact position of the clamping pin members and, particularly, of the linear aligning members may be adjusted such that work piece carrier member, having the clamping pin members and the linear aligning members just loosely connected thereto, is put onto a finished base member and clamped thereon. Thereby, the parts to be fixed to the plate member align to the corresponding parts already fixed to the base member. Now the clamping pin members and the linear aligning members of the work piece carrier member can be definitely fixed by tightening the aforementioned screw means. In this way, the usually required high precision seats for receiving these members are no longer necessary, and the mounting expenditure for these members and parts is considerably decreased by this calibrating method. In addition, if a user manufactures himself such work piece carrier members according to his own specification and just buys the clamping pin members and the linear aligning members, it is much easier to mount these pin and aligning members with required precision to the work piece carrier member.

As far as the reference surfaces in Z-direction is concerned, a preferred embodiment can be seen in a design in which the reference surfaces on the base member are in the shape of annular surfaces projecting from the surface of the base member which are concentrically located around the clamping chuck member and which immediately border to the free space thereof provided for the clamping pin member. In this way, it can be ensured that the reference surfaces loaded with the clamping force are as near as possible to the line of effect of the clamping forces; the result is that the deflection forces induced into the work piece carrier member are as low as possible.

Moreover, the effective area of the reference surfaces should be as large as possible in order to ensure enough high friction forces which avoid a mutual shifting of the work piece carrier member with reference to the base member under the influence of laterally acting forces during the machining of the work piece received on the work piece carrier member.

Preferably, each of the annular reference surfaces should be a multiple of the square cross section of a clamping pin member at the position where the stress thereon is maximal. Under these circumstances, it is ensured that the position of the work piece carrier member within the X-Y-plane does not change even if very high lateral forces occur and that the linear aligning elements are not strained beyond a certain tolerable limit.

For defining the coordinate axes X, Y and Z, a solution is provided in which each linear aligning element pair comprises a wedge-shaped ruler element and a counterpart member having a centering slot. In a preferred embodiment of the invention, a design is proposed in which said counterpart element of the linear aligning element pairs cooperating with a wedge-shaped centering ruler element for the definition of the position in X-, Y- and Z-direction comprises a central portion which is resilient in Z-direction, but rigid in X- and Y-direction in which is located the aforementioned centering slot. Preferably, the portion receiving said centering slit is located in the center of said counterpart member between two connector strip members and connected thereto by means of two resilient bridge members. As the aforementioned counterpart members require more space than linear centering ruler members, it may be preferable, with regard to the size of the clamping apparatus, to provide the counterpart members with the centering slit on the work piece carrier member.

Due to the provision of the clamping means and the linear aligning elements close to the periphery of the clamping apparatus, a space is free in the center of the apparatus. This free space can be used to provide a further clamping apparatus with smaller dimensions for the clamping of small work pieces onto the same base member. Thereby, as one chooses, large heavy work pieces and small light work pieces can be clamped to the same base member which usually is already fixed to a machining apparatus in a well defined position.

BRIEF DESCRIPTION OF THE DRAWINGS

In the following, an embodiment of the clamping apparatus of the invention will be further described, with reference to the accompanying drawings, in which.

DETAILED DESCRIPTION OF A PREFERRED EMBODIMENT

The clamping apparatus shown in the drawings comprises a base member 1 (shown in FIGS. 1 and 3) as well as a work piece carrier member 2 (shown in FIGS. 2 and 4) adapted to be positioned onto the base member 1 to be clamped thereto in a well defined position.

Figure 3:
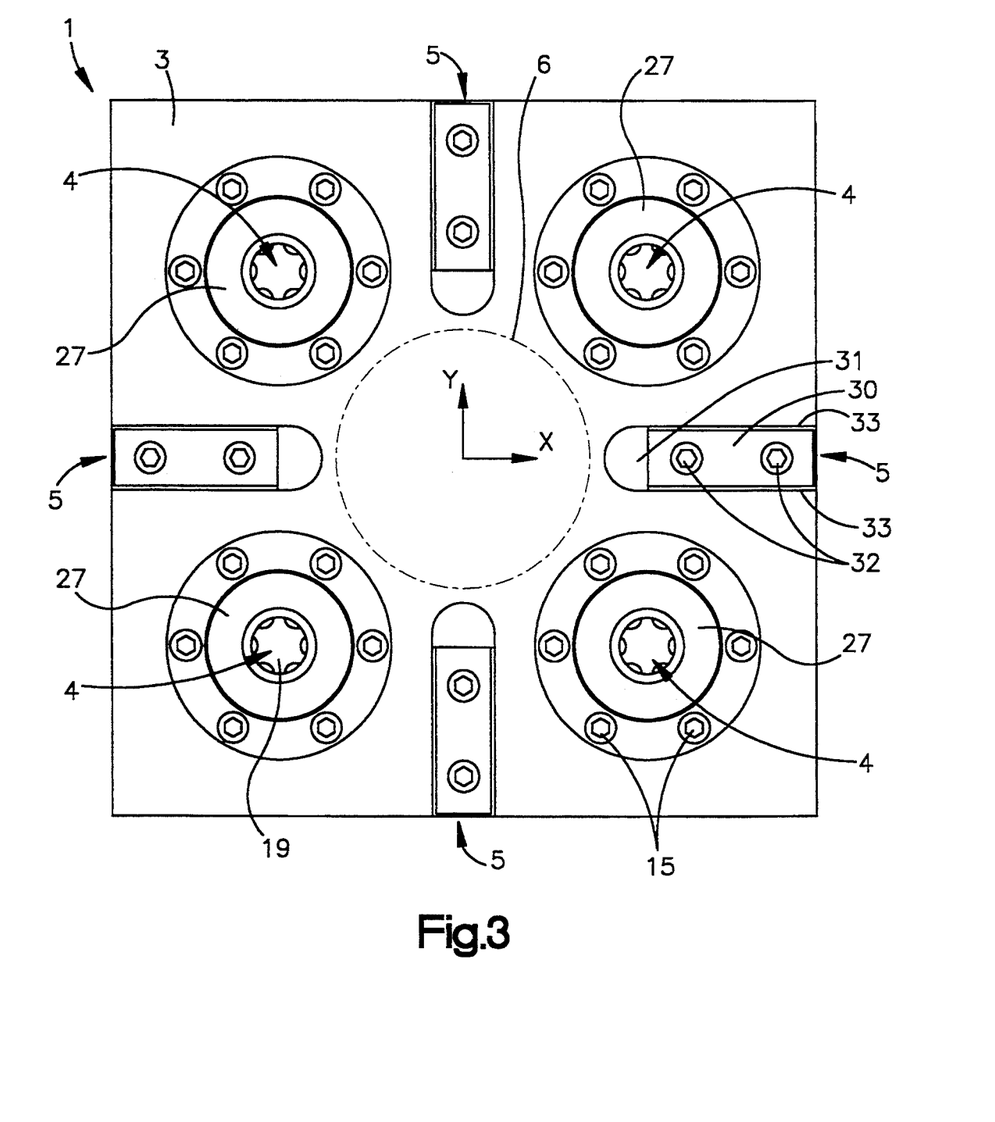
FIG. 3 shows a top view of the base member of the clamping apparatus in a reduced scale.

The base member 1 is intended to be fixed at the work place of a machining apparatus or, eventually, of a measuring station. In the present example, the base member 1 comprises a plate-like housing 3 having an essentially square bottom surface. In the interior of the housing, a clamping mechanism is contained, including four clamping chuck members 4 having a ball locking means. As can be seen in FIG. 3, the four clamping chuck members 4 are central-symmetrically arranged in the region of the four corners of the housing 3. At the top of the housing 3, there are provided four linear aligning elements 5 which are located in crosswise relationship with reference to each other and each between two neighboring clamping chuck members 4. In the center of the housing 3, a free space is provided (as shown in FIG. 3 by a dash-dotted circle) which can be used as the basis for receiving a clamping apparatus with smaller dimensions known per se in the prior art, e.g. as described earlier in this specification. The means for fixing the base member 1 to the working place or working table of a machining apparatus are known to any person skilled in the art and, therefore, are neither shown in the drawings nor need to be further explained.

The work piece carrier member 2 (shown in FIGS. 2 and 4) adapted to be positioned onto the base member 1 and to be clamped thereto in a well defined position generally comprises a plate member 7 having a top surface 8 and a lower surface 9, these two surfaces extending parallel to each other. A work piece to be machined (not shown) can be fixed on the top surface 8 in a manner known per se. The means required therefore, e.g. threaded bores in the plate member 7, are not shown in the drawing because the design of such means are self-evident for every person skilled in the art. The lower surface 9 of the work piece carrier member 2 which faces the base member 1 if the two members are connected to each other has a generally continuous even flat design to which are connected, by means of screws 12 and 13, respectively, the linear aligning elements 10 cooperating with the aligning elements 5 provided at the base member 1 as well as the clamping pin members 11 being parts of the clamping means of the apparatus. For this purpose, the work piece carrier member is provided with continuous bores to receive the screws 12 and 13 such that these screws have a certain radial clearance in the bores.

Figure 1:
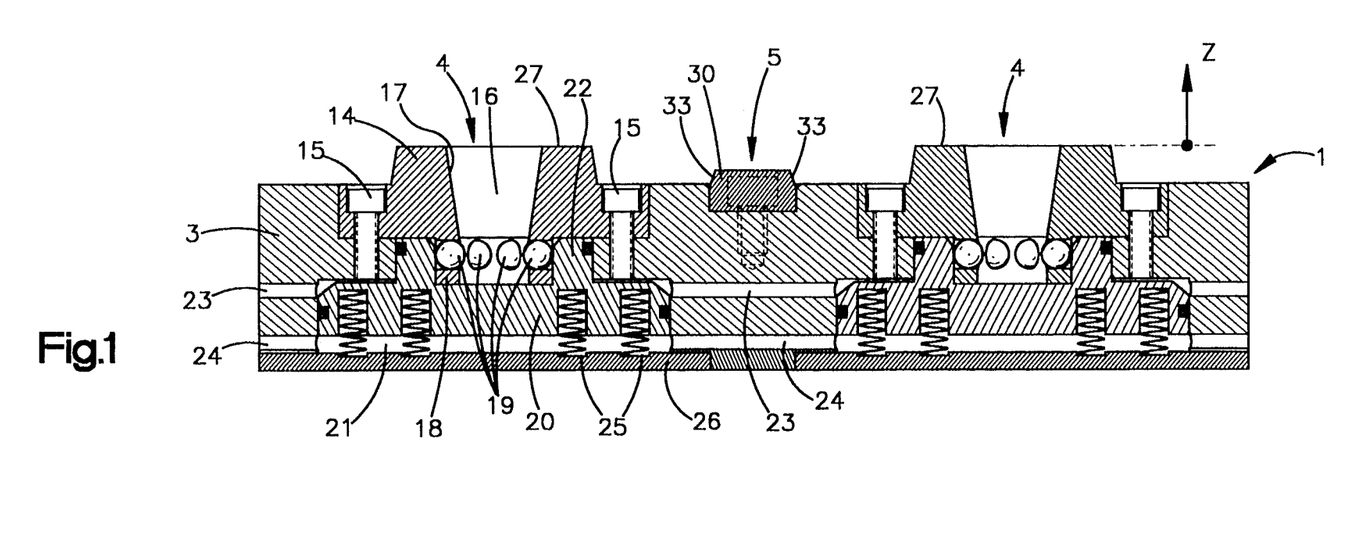
FIG. 1 shows a cross sectional view of the base member of the clamping apparatus.

Each clamping chuck member 4 provided at the base member 1 comprises a clamping sleeve member 14 which is received in a matching recess in the housing 3 of the base member 1 and fixed thereto by means of screws 15. The clamping sleeve members 14 each comprise a hollow chamber 16 adapted to receive the correspondingly located clamping pin member 11 fixed to the work piece carrier member 2. The hollow chamber 16 of the clamping sleeve 14 comprises an inlet portion 17 having a conical cross section which opens towards the outside. Below this inlet portion, as seen in FIG. 1, there is provided an annular portion 18 comprising a wreath of radially displaceable locking balls 19 which are part of the ball locking device of the clamping chuck members 4. The operation of the locking balls 19, during the clamping operation, is effected by means of a piston 20 which can be admitted with a pressure medium from both sides. The piston 20 is located in a cylinder chamber 21 of the housing 3 and includes, with an annular shoulder 22, the annular portion 18 of the clamping sleeve 14. The slightly conical inner surface of the annular shoulder 22 is further conically enlarged towards its top side, this hollow conical portion of the annular shoulder portion 22 cooperating with the locking balls 19 in a manner known per se and obvious for every person skilled in the art. The pressure medium required for the operation of the pistons 20 is supplied via channels 23 and 24, the channels 23 leading to the upper side of the pistons 20 and the channel 24 leading to the lower side of the pistons 20. Furthermore, each of the pistons 20 is under the influence of a number of pressure springs 25 which rest against a cover plate member 26 sealing the cylinder chambers 21 towards their lower side.

The upper surfaces 27 of all clamping sleeves 14 are located in a plane which is somewhat above the surface of the housing 3 and form annular reference surfaces onto which the even lower surface 9 of the plate member 7 of the work piece carrier member is intended to rest. The relevant surface areas 28 of the plate member 7 are marked in FIG. 4 by hatching. These pair wisely cooperating reference surfaces 27 and 28 form the aligning element pairs for the definition of the position of the work piece carrier member 2 in the Z-axis. The base member 1 can be provided with means to clean these reference surfaces 27 and 28, e.g. by blowing pressurized air against these surfaces just before they contact each other, as is well known in the art. For this purpose, air channels can be provided (not shown in the drawings) which lead into the top surfaces 27 of the clamping sleeves 14.

The linear aligning elements 5 provided at the base member 1 are in the form of prismatic centering ruler members 30, as can be seen in FIGS. 1 and 3, which are inserted into grooves 31 of the housing 3 and which are fixed therein by means of screws 32. The protruding longitudinal lateral surfaces of the centering ruler members 30 are wedge-shaped to form wedge-shaped surfaces 33 whereby the wedge angle usually is approximately 7° on both sides. The mounting of the centering ruler members 30 on the base member 1 is not critical as far as its exact position is concerned because the flushing wedge-shaped surfaces 33 of two diametrically facing centering ruler members 30 are commonly ground to their exact size after the fixing of the centering ruler members 30.

Figure 2:
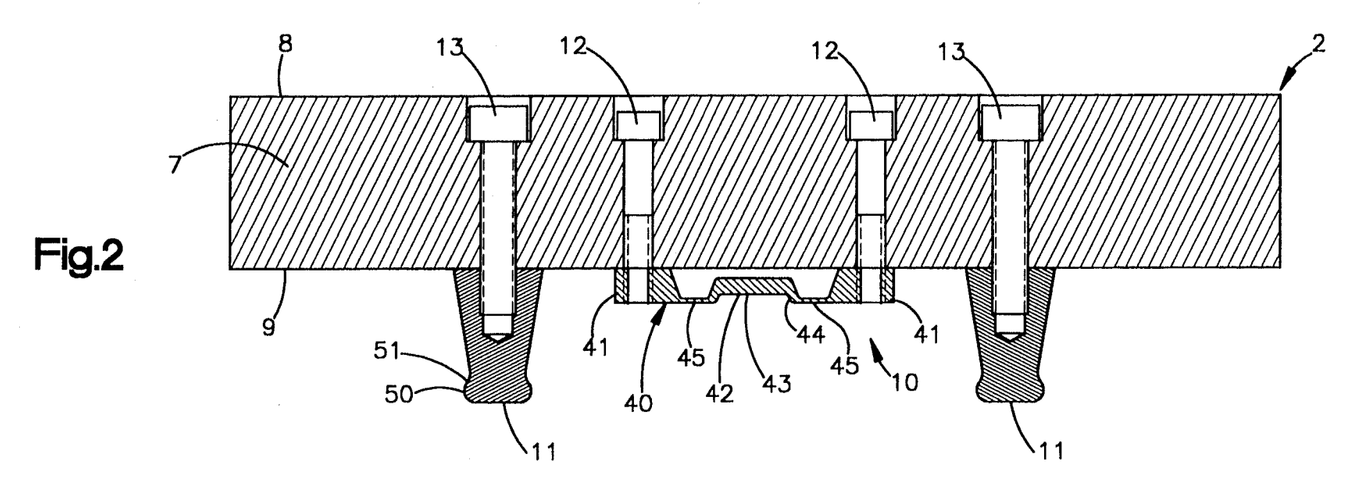
FIG. 2 shows a cross sectional view of the work piece carrier member of the clamping apparatus.
Figure 4:
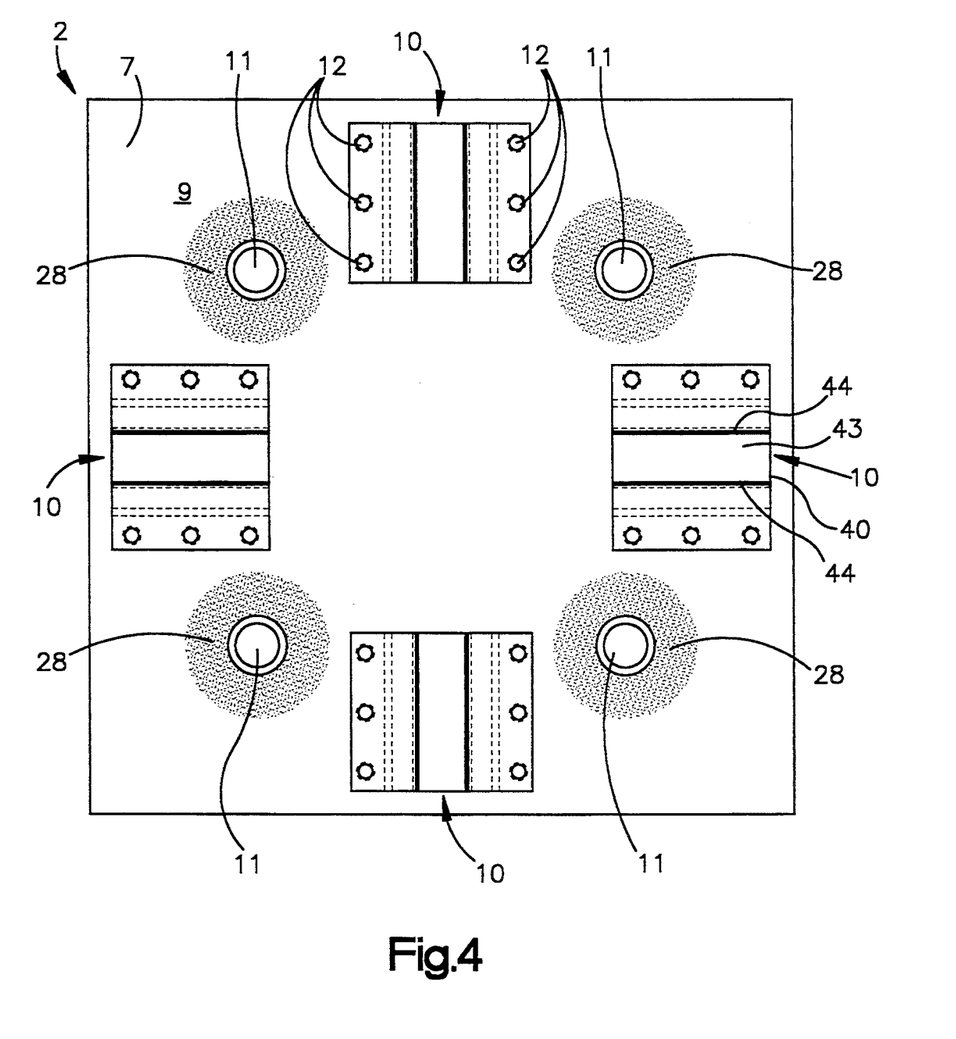
FIG. 4 shows a bottom view of the work piece carrier member of the clamping apparatus in a reduced scale.

Each aligning element 10 of the work piece carrier member 2 designed as counterpart having a centering slit and adapted to cooperate with the correspondingly located linear aligning element 5 of the base member 1 is, according to FIGS. 2 and 4, a profiled plate member 40 having a central portion 42 located between two connector strip members 41. The central portion 42 is provided with a groove 43 serving as a centering slit. The groove 43 has two lateral surfaces 44 which are somewhat inclined, thus corresponding in shape to the centering ruler members 30. On both sides, again, the angle of inclination is approximately 7°. The central portion 42 is connected to the connector strip members 41 by means of resilient bridge members 45. In this way, there is formed a part which is resiliently movable in the direction of the Z-axis, but rigid in a direction running crosswise to the Z-axis.

Each clamping pin member 11 cooperating with the corresponding clamping sleeve 14 is provided with a bulge 50 in the region of its free end, as can be seen in FIG. 50, which is terminated at its rear end by an annular portion 51. At this annular portion, the locking balls 19 of the clamping sleeve 14 engage.

In FIG. 1, the base member 1 is shown in its rest or inoperative position. The pistons 20 of the clamping chuck members 4 are not under the influence of a pressure medium and, thus, are only engaged by the pressure springs 25 which keep the pistons 20 in engagement with the clamping sleeve 14. In this position of the pistons 20, the locking balls 19 of the ball locking device are in their extreme locking position. It is understood that means are provided to prevent the locking balls 19 from falling from their normal position into the hollow chamber 16 of the clamping sleeve 14.

Figure 5:
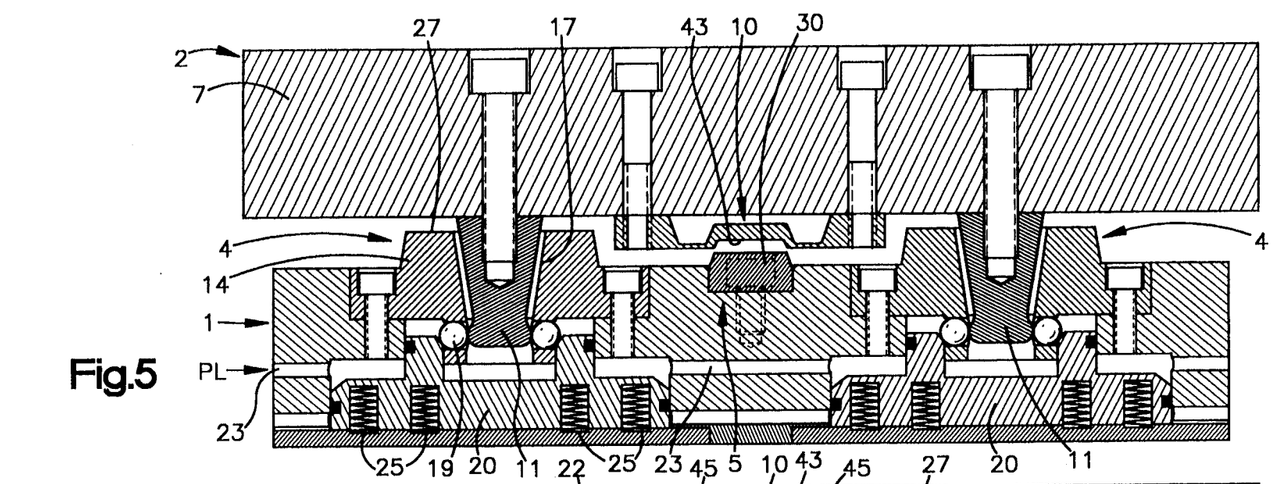
FIG. 5 shows a cross sectional view of the clamping apparatus according to FIGS. 1 and 2 during an intermediate phase of the clamping process, i.e. while the work piece carrier member is to be connected to the base member.

In order to make the base member 1 ready to receive a work piece carrier member 2, as is shown in FIG. 5, a pressurized medium, e.g. pressurized air, is lead to the upper surfaces of the pistons 20 via the channels 23. The result is that the pistons 20 move away from the clamping sleeves 14, against the force of the springs 25, into a lower end position. Thereby, the way is free for the clamping pin members 11 of the work piece carrier member to penetrate into the interior of the clamping sleeve 14 because the locking balls 19 can get out of the way in radial direction. Additionally, during the penetration of the clamping pin member 11 into the corresponding clamping sleeve member 14, the locking balls 19 are radially pushed away under the influence of the bulge 50 (cf. FIG. 2) of the clamping pin member 11.

When the work piece carrier member 2 is put onto the base member 1, the penetration of the clamping pin members 11 into the conically shaped inlet portion 17 of the clamping sleeves 14 causes a preliminary rough positioning of the work piece carrier member 2 with respect to the base member, such that the pair wisely cooperating aligning element pairs 5 and 10 can engage each other, whereby, in each case, the centering ruler member 30 engages the groove 43 of the corresponding aligning element 10. As soon as the work piece carrier member 2 is loosely put on the base member 1, and as soon as the supply of the pressurized air PL through the channels 23 is interrupted, the pressure springs 25 lock the ball locking assembly by pressing the pistons 20 against the clamping sleeves 14. Thereby, the annular shoulders 22 of the pistons 20 urge the locking balls 19 to a radially inward movement such that they engage the bulge 50 of the clamping pin member 11. At latest in this phase, the normally present means for cleaning the reference surfaces 27, 28 (e.g. by blowing with pressurized air) are put into operation. Furthermore, as is also well known in the art, these means can simultaneously be used to monitor the clamping operation by measuring the ram pressure of the air.

Figure 6:
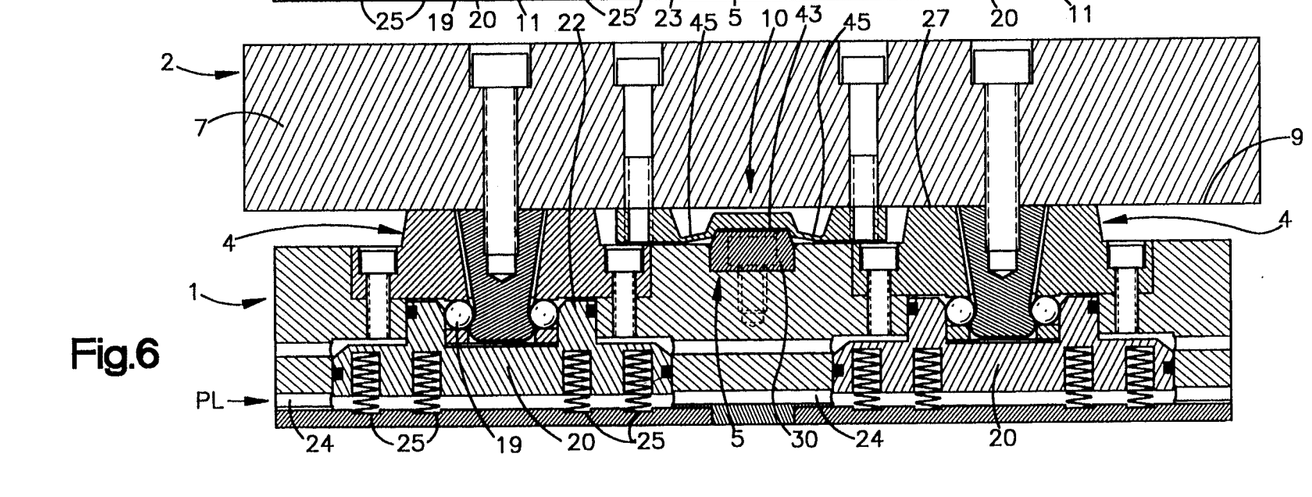
FIG. 6 shows a cross sectional vies of the clamping apparatus according to FIGS. 1 and 2 in a phase when the work piece carrier member is exactly positioned on the base member.

As can be seen in FIG. 6, the final clamping of the work piece carrier member 1 put onto the base member 1 is accomplished by feeding pressurized air PL through the channels 24 to the lower side of the pistons 20. The result is that the locking balls are pressed radially inwards with increased force against the conical annular portion 51 (FIG. 2) of the clamping pin member 11. Thus, the clamping pin members 11 are drawn into the interior of the clamping sleeves 14. During this procedure, the linear aligning elements 5 are exactly lined up with the related aligning elements 10, because each wedge-shaped centering ruler member 30 engages the related groove 43 provided in the counterpart aligning element 10. In the final position, as shown in FIG. 6, a full surface contact between the wedge shaped surfaces 33 and 44 (FIGS. 1 and 2) is achieved.

The above mentioned engagement takes place before the plate member 7 of the work piece carrier member 2 rests in a frictionally fixed manner on the annular reference surfaces 27 of the clamping sleeves 14. Thereby, a well defined position of the work piece carrier member 2 with reference to the base member non only in X- and Y-axis position, but also with regard to the angle around the Z-axis is ensured before the work piece carrier member 2 is finally connected and locked to the base member 1. In the final phase of the clamping process, the centering ruler members 30 are strongly pressed into the grooves 43 of the corresponding aligning elements 10 whereby the central portion 42 thereof is bent in the direction of the Z-axis under the influence of the clamping force.

The final position of the work piece carrier member 2 with regard to the base member 1 is shown in FIG. 6. In this phase, the flat lower surface 9 of the plate member 7 of the work piece carrier member 2 rests under high pressure on the reference surfaces 27 of the base member 1. In conjunction with the highly dimensioned surface contact, this results a positive connection between the work piece carrier member 2 and the base member 1 which can take up also very high laterally directed forces. Thus, the aligning members 10 serving as positioning elements are not subjected to laterally acting forces. In this manner, an eventual stretching or upsetting of the resilient bridge members 45 and, consequently, a lateral displacement of the work piece carrier member 2 can be kept within very narrow limits.

The work piece carrier member 2 of the clamping apparatus as described herein before may be positioned without problems on any surface whereby the clamping pin members 11 serve as supports because the front surfaces of the clamping pin members 11 do not have any function as far as the exact positioning of the work piece carrier member is concerned; consequently, they must not be treated with special care.

What is claimed is:

1. An apparatus for clamping a work piece at a work station of a machining apparatus in a well defined position, comprising:
   a base member to be fixed in the working area of a machining apparatus;
   a work piece carrier member adapted to be put onto said base member and to be fixed thereto;
   said base member and said work piece carrier member each comprising pair wisely cooperating aligning means in order to align the position of said work piece carrier member with respect to said base member along three coordinate axes running perpendicular to each other as well as with regard to the angular position;
   clamping means adapted to develop a clamping force to fix said work piece carrier member to said base member in said well defined position which is defined by said aligning means;
   said aligning means comprising first aligning element pairs for the definition of the position of the work piece carrier member in the Z-axis in the form of cooperating reference surfaces located at the work piece carrier member and the base member, respectively;
   said aligning means further comprising second aligning element pairs for the definition of the position of the work piece carrier member in the X-axis and third aligning element pairs for the definition of the position of the work piece carrier member in the Y-axis, both said second and third aligning element pairs being in the form of cooperating linear aligning element pairs;
   said cooperating linear alignment pairs each comprising a wedge-shaped centering ruler member and a counterpart member with a matching centering slit;
   said clamping means comprising a plurality of clamping members, each including a clamping pin member fixed to the work piece carrier member and a clamping chuck member located in the base member;
   said work piece carrier member comprising an essentially even, continuous flat surface at its side which faces said base member if said work piece carrier member is clamped to said base member, said flat surface of said work piece carrier member portionally forming one of said reference surfaces;
   said base member comprising surface means at its side which faces and contacts said flat surface of said work piece carrier member if said work piece carrier member is clamped to said base member;
   each one member of said second and third linear aligning element pairs for the definition of the position of the work piece carrier member in X- and Y-direction being directly connected to said flat surface of said work piece carrier member, and each of said clamping pin members of said clamping means also being directly connected to said flat surface of said work piece carrier member.

2. An apparatus according to claim 1 in which said work piece carrier member is constituted by a plate member having even flat and parallel extending top and lower surfaces.

3. An apparatus according to claim 1 in which said base member comprises a plate-like shaped housing member having a square base area in which are provided four clamping chuck members with ball locking mechanisms, said clamping chuck members being located in the region of the four corners of the housing in a centrally symmetric relationship.

4. An apparatus according to claim 1 in which said counterpart member of the linear aligning member pairs for the definition of the coordinate axes X, Y and Z which cooperates with said wedge-shaped centering ruler member comprises a portion which is resilient in the direction of the Z-axis but rigid in a direction crosswise to the Z-axis, said portion comprising said centering slot.

5. An apparatus according to claim 4 in which said portion comprising said centering slot is located in the center of said counterpart member between two connector strip members and is connected to said connector strip members by means of resilient strip members.

6. An apparatus according to claim 1 in which said wedge-shaped centering ruler members are constituted by prismatic body members which are inserted in grooves provided in said base member and connected thereto by means of screw means, whereby the portion projecting out of the grooves of the lateral side faces of the centering ruler members are designed as wedge surfaces.

7. An apparatus according to claim 6 in which the wedge angle of said wedge surfaces of the centering ruler members on both sides is approximately 7°.

8. An apparatus according to claim 1 in which said linear aligning element pairs for the definition of the coordinate axes X, Y and Z are located between said reference surfaces such that the cross of the axes essentially is in the center of the apparatus.

9. An apparatus according to claim 1 in which said aligning elements constituted by said wedge-shaped centering ruler elements are fixed to said base member and said counterpart members comprising said centering slit are fixed to said work piece carrier member.

10. An apparatus according to claim 3 in which there is provided, in the center of said housing member, room for receiving a further clamping apparatus having smaller dimensions.

11. An apparatus for clamping a work piece at a work station of a machining apparatus in a well defined position, comprising:

a base member to be fixed in the working area of a machining apparatus;

a work piece carrier member adapted to be put onto said base member and to be fixed thereto;

said base member and said work piece carrier member each comprising pair wisely cooperating aligning means in order to align the position of said work piece carrier member with respect to said base member along three coordinate axes running perpendicularly to each other as well as with regard to the angular position;

clamping means adapted to develop a clamping force to fix said work piece carrier member to said base member in said well defined position which is defined by said aligning means;

said aligning means comprising first aligning element pairs for the definition of the position of the work piece carrier member in the Z-axis in the form of cooperating reference surfaces located at the work piece carrier member and the base member, respectively;

said aligning means further comprising second aligning element pairs for the definition of the position of the work piece carrier member in the X-axis and third aligning element pairs for the definition of the position of the work piece carrier member in the Y-axis, both said second and third aligning element pairs being in the form of cooperating linear aligning element pairs;

said cooperating linear alignment pairs each comprising a wedge-shaped centering ruler member and a counterpart member with a matching centering slit;

said clamping means comprising a plurality of clamping members, each including a clamping pin member fixed to the work piece carrier member and a clamping chuck member located in the base member;

said work piece carrier member comprising an essentially even, continuous flat surface at its side which faces said base member if said work piece carrier member is clamped to said base member, said flat surface portionally forming one of said reference surfaces;

each one member of said second and third linear aligning element pairs for the definition of the position of the work piece carrier member in X- and Y-direction being directly connected to said flat surface, and each of said clamping pin members of said clamping means also being directly connected to said flat surface;

said work piece carrier member being constituted by a plate member having even flat and parallel extending top and lower surfaces; and said plate member being provided with continuous bores for inserting screw means for fixing said linear aligning elements and said clamping pin members.

12. An apparatus according to claim 11 in which said continuous bores have a diameter which is larger than the diameter of the screw means to be received in said continuous bores such that a radial clearance for said screw means is ensured.

13. An apparatus for clamping a work piece at a work station of a machining apparatus in a well defined position, comprising:

a base member to be fixed in the working area of a machining apparatus;

a work piece carrier member adapted to be put onto said base member and to be fixed thereto;

said base member and said work piece carrier member each comprising pair wisely cooperating aligning means in order to align the position of said work piece carrier member with respect to said base member along three coordinate axes running perpendicularly to each other as well as with regard to the angular position;

clamping means adapted to develop a clamping force to fix said work piece carrier member to said base member in said well defined position which is defined by said aligning means;

said aligning means comprising first aligning element pairs for the definition of the position of the work piece carrier member in the Z-axis in the form of cooperating reference surfaces located at the work piece carrier member and the base member, respectively;

said aligning means further comprising second aligning element pairs for the definition of the position of the work piece carrier member in the X-axis and third aligning element pairs for the definition of the position of the work piece carrier member in the Y-axis, both said second and third aligning element pairs being in the form of cooperating linear aligning element pairs;

said cooperating linear alignment pairs each comprising a wedge-shaped centering ruler member and a counterpart member with a matching centering slit;

said clamping means comprising a plurality of clamping members, each including a clamping pin member fixed to the work piece carrier member and a clamping chuck member located in the base member;

said work piece carrier member comprising an essentially even, continuous flat surface at its side which faces said base member if said work piece carrier member is clamped to said base member, said flat surface portionally forming one of said reference surfaces;

each one member of said second and third linear aligning element pairs for the definition of the position of the work piece carrier member in X- and Y-direction being directly connected to said flat surface, and each of said clamping pin members of said clamping means also being directly connected to said flat surface; and said reference surfaces on said base member being in the shape of annular surfaces projecting from the surface of said base member which are concentrically located around said clamping chuck member and which immediately border to the free space thereof provided for the clamping pin member.

14. An apparatus according to claim 13 in which the area of each of said annular surfaces is a multiple of the square cross-section of a clamping pin member at the position where the stress thereon is maximal.

15. An apparatus according to claim 13 in which the clamping chuck members each comprise a clamping sleeve member provided with locking balls, said clamping chuck members projecting from the surface of said housing and the front faces thereof serving as the reference surfaces of the base member for defining the position of the work piece carrier member in Z-direction.

* * * * *